United States Patent [19]

Beckley

[11] Patent Number: 4,721,527

[45] Date of Patent: Jan. 26, 1988

[54] COLORED AUTO WAX

[76] Inventor: Wayne E. Beckley, P.O. Box 13031, El Paso, Tex. 79912

[21] Appl. No.: 892,435

[22] Filed: Jul. 11, 1986

Related U.S. Application Data

[63] Continuation-in-part of Ser. No. 691,856, Jan. 16, 1985, abandoned.

[51] Int. Cl.$^4$ ................................................ C09G 1/08
[52] U.S. Cl. ........................................ 106/10; 106/23; 106/271; 106/272
[58] Field of Search .................... 106/10, 20, 22, 23, 106/271, 272, 10

[56] References Cited

U.S. PATENT DOCUMENTS

| | | | |
|---|---|---|---|
| 1,605,041 | 11/1926 | Kritchevsky et al. | 106/10 |
| 1,871,187 | 8/1932 | Lindsay | 106/10 |
| 1,974,854 | 9/1934 | Schrauth et al. | 106/10 |
| 2,071,027 | 2/1937 | Dacus et al. | 106/10 |
| 2,078,971 | 5/1937 | Pickens et al. | 106/10 |
| 2,236,296 | 3/1941 | Minich et al. | 106/20 |
| 2,893,886 | 7/1959 | Erskine et al. | 106/272 |
| 4,153,468 | 5/1979 | Bienvenu | 106/271 |

OTHER PUBLICATIONS

Bennett, H. (ed.) *The Chemical Formulary*, vol. VI, pp. 398–399; Chemical Pub. Co., N.Y. 1943.
*Hackh's Chemical Dictionary*, 4th ed. McGraw-Hill, N.Y. 1969 p. 227.

*Primary Examiner*—Paul Lieberman
*Assistant Examiner*—Linda D. Skaling
*Attorney, Agent, or Firm*—K. S. Cornaby

[57] ABSTRACT

A liquid wax using a colored ink is disclosed. The product comprises a mixture of at least one wax and one liquid solvent, plus a water-soluble ink which produces a smooth, homogeneous liquid. The resultant colored wax is produced by a combination of blending and/or agitation, and moderate to high heating.

4 Claims, No Drawings

COLORED AUTO WAX

BACKGROUND OF THE INVENTION

This application is a continuation-in-part of co-pending application, Ser. No. 691,856, filed Jan. 16, 1985 now abandoned.

Although there have been waxes produced containing dyes, none has been formulated for automobile finishes, and more specifically none that contains an ink as the colorant. Those that have used dyes have used kerosene or similar dissolving medium. This invention uses a water-based dispersal-type pigment in suspension as a coloring agent.

Further, this invention will show the distinct difference between an ink and a dye. An ink is not a dye.

Dyes are substances which are dissolved in liquid and impart their color effect to materials by staining or being absorbed. Dyes, then, are colored compounds which have solubility in the vehicle or solvent.

The main constituents of inks are pigment, vehicle, and drier. Pigment contains a very large number of molecules, but dyes just a few molecules. When a pigment is mixed or ground in a liquid vehicle, it does not dissolve but remains dispersed or suspended in the liquid. Dyes are colored substances that are dissolved to materials by staining or being absorbed.

On the other hand, an ink is a pigment that when mixed in a liquid carrier does not dissolve, but remains dispersed or suspended in the liquid. These pigments are insoluble. Some pigments are found naturally such as sepia which comes from cuttle fish. Others are manufactured commercially. The actual hue and brightness of a pigment depends upon the amount of light which it absorbs and which it reflects. Thus, the term "colored ink". This is a well known, well defined term in the ink art. Pigments that are used in colored car wax are thus resistant to water, acids, alkalis, and organic solvents.

There are several types of inks, such as relief ink, gravure ink, watercolor ink and lithographic ink.

SUMMARY OF THE INVENTION

A liquid wax in colors using the dispersal of a nondissolved, water-based pigment in a water-based carrier.

This invention preferably uses a block printers screen ink, using the following formula:

| | |
|---|---|
| Precipitated Chalk | 65.0% |
| White Spirit | 14.8% |
| Varnish | 10.0% |
| Stand Oil | 6.5% |
| Iron Blue | 3.5% |
| Naphthenates | 0.2% |

DETAILED DESCRIPTION OF A PREFERRED EMBODIMENT

According to the invention, a pigmented liquid wax product is provided by combining a wax with a liquid carrier and a colored ink.

A preferred process for preparing the wax product includes heating two parts of carnauba wax having a melting point of from 130°–150° F. Eight parts kerosene is heated to 150° F. and blended using rapid agitation with the melted wax. The resulting product is allowed to cool slightly. The next step comprises heating a mixture of 10 parts water, one part castile soap and 1 oz. ink of the desired color to approximately 200° F. The two mixtures are then combined slowly to produce a smooth, homogeneous wax product.

It is contemplated that any natural or synthetic wax can be used in this product, such as carnauba, beeswax, paraffin, Chinese, Japanese, candelilla, montan, ceresin wax ang high molecular weight fatty acids. It is important that the wax must be soluble in a liquid solvent to produce a liquid wax product.

It is also important that the colored ink be water-soluble, so that the ink can be diluted to the proper concentration prior to heating and mixing with the wax-based liquid.

While this invention has been described with respect to preferred embodiments, it is understood that alternative embodiments and substantial equivalents are included within the scope of the invention as defined by the appended claims.

I claim:

1. A pigmented wax product comprising in combination:
   at least one wax;
   at least one liquid solvent and carrier for said wax; and
   at least one colored ink containing a pigment suspended in a liquid carrier, said ink comprising the following composition: 65% Precipitated Chalk; 14.8% White Spirit; 10% Varnish; 6.5% Stand Oil; 3.5% Iron Blue; and 0.2% Naphthenates.

2. A wax product as set forth in claim 1, wherein said wax is carnauba wax.

3. A wax product as set forth in claim 1, wherein said liquid solvent is kerosene.

4. A wax product as set forth in claim 1, further including a soap product.

* * * * *